United States Patent
Campbell et al.

(10) Patent No.: US 9,366,279 B2
(45) Date of Patent: Jun. 14, 2016

(54) RIVETS WITH ANTI-ROTATIONAL FEATURES

(71) Applicant: Ford Global Technologies, LLC, Dearborn, MI (US)

(72) Inventors: Aindrea McKelvey Campbell, Beverly Hills, MI (US); Michael William Danyo, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/798,388

(22) Filed: Mar. 13, 2013

(65) Prior Publication Data

US 2014/0271037 A1      Sep. 18, 2014

(51) Int. Cl.
     *F16B 19/08*      (2006.01)

(52) U.S. Cl.
     CPC ............... *F16B 19/08* (2013.01); *F16B 19/086* (2013.01)

(58) Field of Classification Search
     CPC ........... F16B 5/04; F16B 19/086; F16B 19/06
     USPC .......... 411/501, 358, 448, 451.1, 71, 74, 187, 411/188
     See application file for complete search history.

(56) References Cited

U.S. PATENT DOCUMENTS

| | | | | |
|---|---|---|---|---|
| 180,747 | A * | 8/1876 | Bray | 411/501 |
| 1,199,525 | A * | 9/1916 | Boutelle | 411/504 |
| 2,096,598 | A * | 10/1937 | Sheane | 411/501 |
| 4,757,596 | A * | 7/1988 | Herb | 29/524.1 |
| 5,564,873 | A | 10/1996 | Ladouceur et al. | |
| 6,263,560 | B1 | 7/2001 | Edwards | |
| 6,802,682 | B2 * | 10/2004 | Stevenson et al. | 411/501 |
| 6,814,531 | B2 * | 11/2004 | Stevenson et al. | 411/501 |
| 7,032,296 | B2 * | 4/2006 | Zdravkovic et al. | 29/709 |
| 7,832,970 | B2 * | 11/2010 | Wang et al. | 411/171 |
| 8,328,485 | B2 * | 12/2012 | Babej et al. | 411/181 |
| 2009/0269165 | A1 * | 10/2009 | Fujii et al. | 411/503 |
| 2010/0232906 | A1 * | 9/2010 | Singh et al. | 411/501 |
| 2011/0211934 | A1 * | 9/2011 | Walther | 411/387.1 |
| 2013/0011217 | A1 * | 1/2013 | Avellon | 411/500 |
| 2013/0224426 | A1 * | 8/2013 | Ellis et al. | 428/99 |

* cited by examiner

*Primary Examiner* — Flemming Saether
(74) *Attorney, Agent, or Firm* — Raymond Coppiellie Brooks Kushman P.C.

(57) ABSTRACT

Semi-tubular self-piercing rivets and solid rivets are provided with surface features such as recesses or lobes. The recesses or lobes engage the panels that are joined by the rivet to prevent rotation of one or both panels after rivet insertion. The recesses or lobes may be provided at the head end or tip end of the rivet or may be provided at both the head end and the tip end of the rivet.

6 Claims, 2 Drawing Sheets

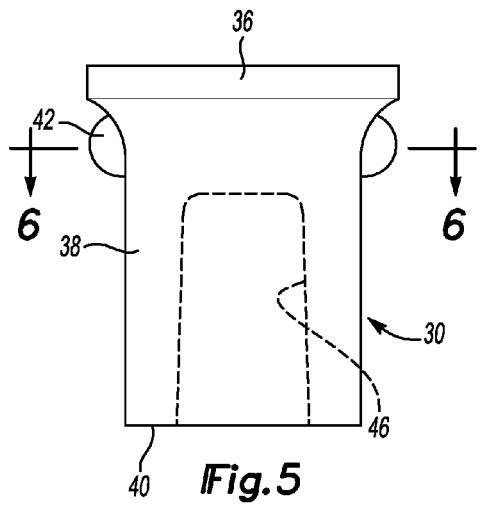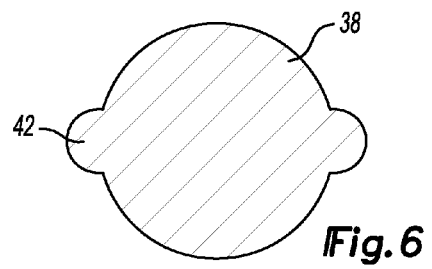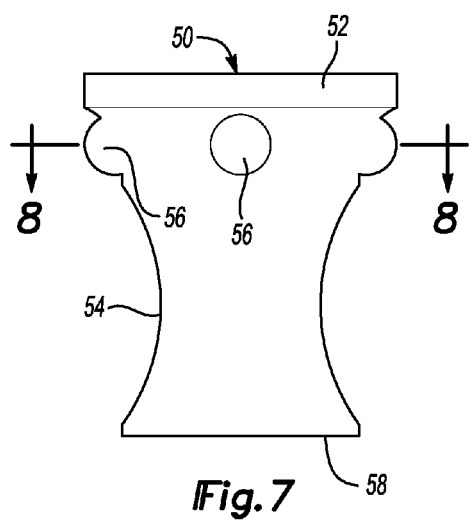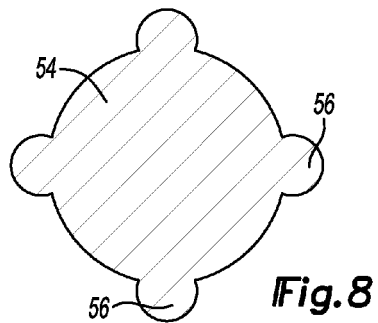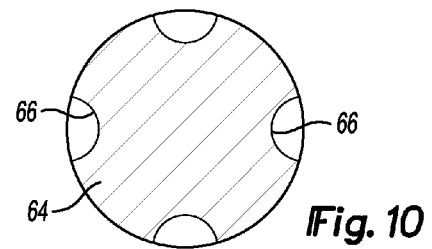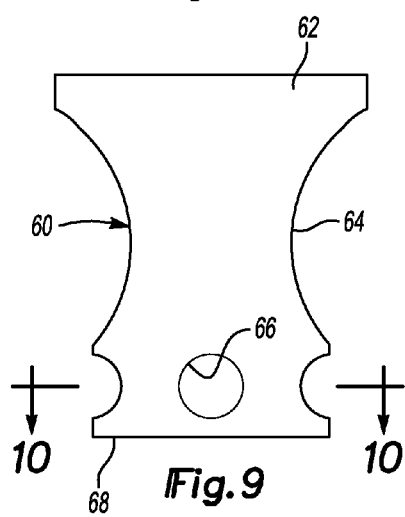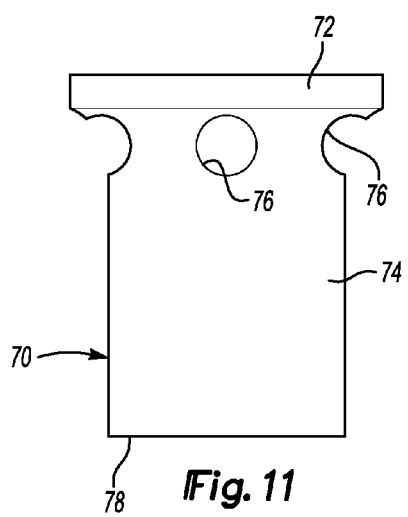

RIVETS WITH ANTI-ROTATIONAL FEATURES

TECHNICAL FIELD

This disclosure relates to solid, semi-tubular, blind/break stem or tubular rivets having surface features for interlocking with a top or bottom sheet of a plurality of panels that are fastened by the rivet.

BACKGROUND

The body structure of aluminum-intensive vehicles may utilize rivets to achieve the necessary joint strength, durability and high volume production. One example of a type of rivet used in high volume production is a self-piercing rivet (SPR). SPR joints provide sufficient strength in uniaxial lap shear and coach peel orientations as measured on laboratory test coupons. However, due to the axial symmetry of a circular rivet, panels joined by SPRs are subject to rotation when a torsional load is applied to the panels. This is particularly true when a single rivet or a small number of rivets are used to fasten parts of an assembly together. In such a case, the joined panels may pivot relative to each other (i.e., a top layer may rotate relative to a bottom layer). Relative rotation is eliminated in full body construction with multiple rivets as an assembly is fabricated into a rigid body structure. However, during geometry setting, or early stages of body-in-white assembly, fewer SPRs are installed and torsional distortion (i.e., "match boxing") may occur.

The above problem and other problems are addressed by this disclosure as summarized below.

SUMMARY

Two basic geometries exist today for providing riveting options that include: 1) a semi-tubular or tubular rivets that splay open during the setting process and forms a button on the bottom layer; and 2) a solid rivet that pierces the sheet metal stack and the adjoining material is deformed in a secondary coining operation. In the first scenario, the rivet is primarily deformed. In the second scenario, the sheet metal is primarily deformed as the sheet metal is formed into the contour of the rivet shape.

This disclosure provides one example of a new rivet geometry having surface features that resist rotation in response to torsional loads that may be applied to the joined panels. Examples of such a surface features may include a concave dimple or a convex lobe located along the top or bottom of the cylindrical body of the rivet. The surface features function to eliminate the circular bearing-like surface provided by conventional rivets. The surface features provide resistance to an applied torsional load and "lock" either or both of the top and bottom sheets in a sheet metal assembly stack up preventing rotation.

According to one aspect of this disclosure, a rivet is disclosed for joining a plurality of parts including a top part and a bottom part. The rivet includes a cylindrical body with a head provided at a first end of the body and a tip provided at a second end of the body. Several surface features are provided at the first end at a juncture with the head. The surface features extend to a limited extent along the body and engage only the top part.

According to other aspects of this disclosure, the rivet may have surface features extend along the body or are provided in discrete areas. The surface features may be concave dimples defined by the head and the body. The concave dimples may include a partially spherical surface. Alternatively, the surface features may be convex lobes formed at the juncture of the head and the body. The convex lobes may include a partially spherical surface. The body may be a solid cylindrical shaped portion of the rivet or a tubular or semi-tubular shaped portion of the rivet.

According to another aspect of this disclosure, a rivet is disclosed for non-rotatably joining a plurality of parts including a top part and a bottom part. The rivet includes a cylindrical body with a head provided at a first end of the body and a tip provided at a second end of the body. A plurality of surface features may be provided at the second end. The surface features extend to a limited extent along the body and engage only the bottom part.

According to another aspect of this disclosure, a rivet is disclosed for joining a plurality of parts including a top part and a bottom part. The rivet includes a cylindrical body with a head provided at a first end of the body and a tip provided at a second end of the body. A plurality of head end surface features are provided at the first end at a juncture with the head that extend to a limited extent along the body to engage only the top part. A plurality of tip surface features are provided at the second end that extend to a limited extent along the body and engage only the bottom part.

The above aspects of this disclosure and other aspects will be more specifically described below with reference to the attached drawings.

BRIEF DESCRIPTION OF THE DRAWINGS

FIG. 5 is a side elevation view of a semi-tubular self-piercing rivet having lobes at the head end of the rivet;

FIG. 6 is a cross-sectional view taken along the line 6-6 in FIG. 5;

FIG. 7 is a side elevation view of a solid self-piercing rivet with concave side walls and having a plurality of lobes disposed near the head of the rivet;

FIG. 8 is a cross-sectional view taken along the line 8-8 in FIG. 7;

FIG. 9 is a side elevation view of a solid self-piercing rivet with concave side walls and having a plurality of recesses formed near the tip end of the rivet;

FIG. 10 is a cross-sectional view taken along the line 10-10 in FIG. 9; and

FIG. 11 is a side elevation view of a rivet having recesses formed near the head of the rivet.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
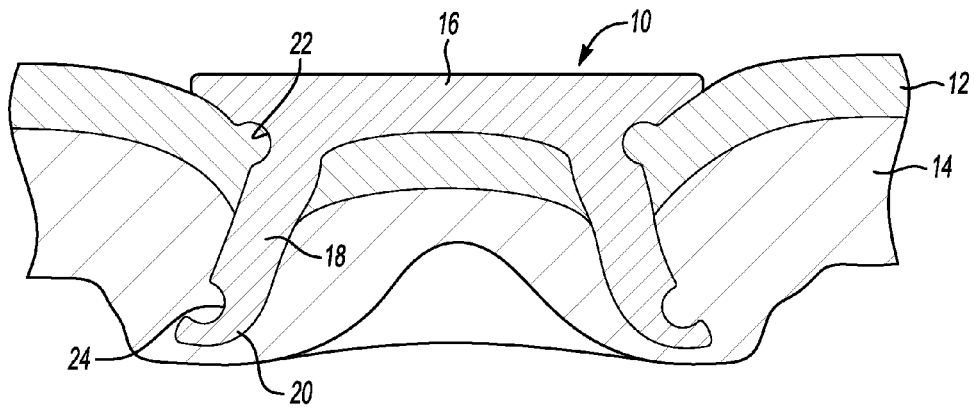
FIG. 1 is a cross-sectional view of a semi-tubular self-piercing rivet joining two panels together that has indentations for preventing rotation of the panels.
Figure 2:
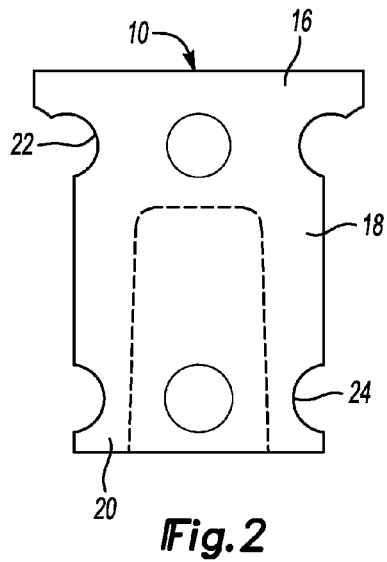
FIG. 2 is a side elevation view of a semi-tubular self-piercing rivet shown in FIG. 1.

Referring to FIGS. 1 and 2, a semi-tubular self-piercing rivet (SPR) 10 is illustrated that is used to join a top panel 12, or insertion side panel, and a bottom panel 14, or backing panel, together. The SPR 10 has a head 16 at one end of a tubular body 18, or rivet barrel. A tip 20 is provided on the opposite end of the tubular body 18 from the head 16. The SPR 10 has a plurality of head end recesses 22 that are located at or near the juncture of the tubular body 18 and the head 16. The SPR 10 also has a plurality of tip end recesses 24 that are formed at or near the tip 20.

When the SPR 10 is inserted into the top panel 12 and the bottom panel 14, material from the panels flows into the head end recesses 22 and the tip end recesses 24. The panel material in the recesses 22, 24 prevents relative rotation of the panels 12, 14.

The semi-tubular self-piercing rivet 10 as described and illustrated is intended to be an example but the claimed concept is not limited to semi-tubular self-piercing rivets. Other types of rivets such as solid (sometimes referred to as "pin cushion" rivets), tubular, or blind/break stem rivets may also be used in practicing the claimed concepts. In addition, solid rivets may include concave side walls. A circumferential groove may also be formed near the tip end of a rivet that incorporates the claimed anti-rotation surface features.

Figure 4:
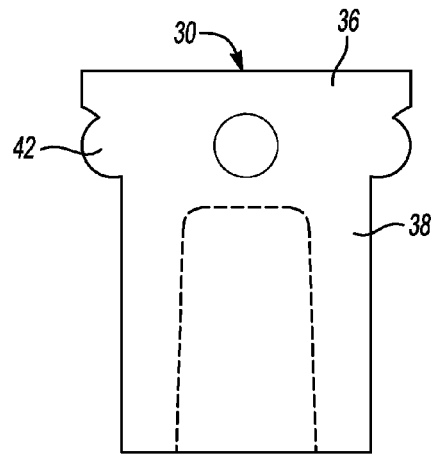
FIG. 4 is a side elevation view of a semi-tubular self-piercing rivet shown in FIG. 3.
Figure 3:
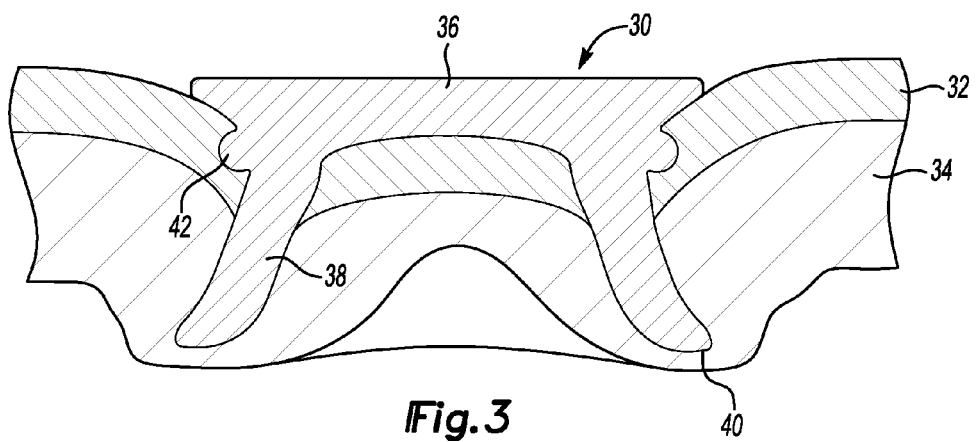
FIG. 3 is a cross-sectional view of an alternative embodiment of a semi-tubular self-piercing rivet joining two panels together that has lobes for preventing rotation of the panels.

Referring to FIGS. 3 and 4, an alternative embodiment of a tubular SPR 30 is shown joining a top panel 32 and a bottom panel 34. The references to top and bottom in FIGS. 1 and 3 refers to their orientation as illustrated. It should be understood that the SPR 10 and SPR 30 may be inserted in any orientation, inverted, sideways or at any other angular orientation. As used herein in the claims and specification of this application, the terms "top" and "bottom" refer to the side of the assembly in which the SPR is inserted and the backing panel, respectively. The head end lobe 42 nests in the top panel 32, respectively, when the SPR 30 is driven into the top panel 32 and bottom panel 34. The lobes 42 prevent rotation of the top panel 32.

With continued reference to FIGS. 3 and 4, the SPR 30 includes a head 36 at one end of a tubular body 38. A tip 40 is provided at the opposite end of the tubular body 38 from the head 36. A plurality of head end lobes 42 are provided at or near the juncture of the head 36 and tubular body 38. The convex lobes 42 may be located under a radius of curvature of the head 36 of the rivet 30.

The recesses 22, 24 and lobes 42 may be generally defined as "surface features." The recesses and lobes described with reference to the embodiments of FIGS. 5-11 may also be generally referred to as surface features and function to inhibit panel rotation.

Referring to FIGS. 5 and 6, the tubular SPR 30 similar to that shown in FIGS. 3 and 4 is illustrated. The tubular SPR 30 includes head 36, tubular body 38 and tip, as described above with reference to FIGS. 3 and 4. The tubular SPR 30 also includes two head end lobes 42, instead of the four lobes shown in FIG. 4. The two head end lobes 42 are shown in cross-section on the tubular body 38. The tubular body 38 defines a central blind bore 46 that is shown in phantom lines in FIG. 5 to extend from the tip end 40 and partially through the tubular body 38. The central blind bore 46 does not extend through the head 36 in the semi-tubular embodiment but may extend through the entire body and head of a tubular rivet.

Referring to FIG. 7, a solid rivet 50 is illustrated that includes a head 52 at one end of a cylindrical body 54. A plurality of head end lobes 56 are formed on the rivet 50 at the juncture of the head 52 and the cylindrical body 54. A tip 58 is provided on the opposite end of the cylindrical body 54 from the head 52.

Referring to FIG. 8, the head end lobes 56 are shown extending outwardly from the cylindrical body 54. The cylindrical body 54 is solid and does not include a central blind bore 46 (shown in FIG. 5).

Referring to FIGS. 9 and 10, another alternative embodiment of a solid rivet 60 is illustrated. The solid rivet 60 includes a head 62 at one end of a concave body 64 that includes concave side walls. A plurality of tip end recesses 66 are formed in the body 64 near the tip 68 of the rivet 60. The tip end recesses 66, as shown in FIG. 10, extend into the body 64 to a limited extent.

Referring to FIG. 11, a rivet 70 is illustrated that includes a head 72 at one end of a cylindrical body 74. A plurality of head end recesses 76 are formed near or at the juncture of the cylindrical body 74 and the head 72. A tip 78, or end face, of the rivet 70 is provided at the opposite end of the cylindrical body 74 from the head 72.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A rivet non-rotatably piercing and joining a plurality of parts including a top part and a bottom part, comprising:
    a head provided at a first end of the rivet;
    a tip provided at a second end of the rivet;
    a first plurality of partially spherical recesses provided at a juncture of the head and a tubular rivet barrel; and
    a second plurality of partially spherical recesses provided proximate a tip of the tubular rivet barrel.

2. The rivet of claim 1 wherein said rivet is a self-piercing rivet.

3. A rivet non-rotatably piercing and joining a plurality of parts including a top part and a bottom part, comprising:
    a tubular body;
    a head provided at a first end of the tubular body;
    a tip provided at a second end of the tubular body; and
    the first and second ends of the tubular body defining a plurality of recesses that extend only to a limited extent along the tubular body and wherein the recesses in the first end engage only a top surface of the top part, and the bottom part is embedded in the recesses of the second end.

4. The rivet of claim 3 wherein the recesses are concave dimples.

5. The rivet of claim 4 wherein the concave dimples include a partially spherical surface.

6. The rivet in claim 3 wherein said rivet is a self-piercing rivet.

* * * * *